United States Patent
Hong et al.

(10) Patent No.: US 12,129,328 B2
(45) Date of Patent: Oct. 29, 2024

(54) LOW-CARBON POLYURETHANE FOAM COMPOSITION FOR AUTOMOBILE INTERIOR MATERIAL AND PREPARATION METHOD THEREFOR

(71) Applicants: Hyundai Motor Company, Seoul (KR); Kia Corporation, Seoul (KR)

(72) Inventors: Chae Hwan Hong, Seoul (KR); Jin Woo Choung, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/063,665

(22) Filed: Dec. 8, 2022

(65) Prior Publication Data

US 2023/0295367 A1 Sep. 21, 2023

(30) Foreign Application Priority Data

Mar. 16, 2022 (KR) .................. 10-2022-0032674

(51) Int. Cl.

| | | |
|---|---|---|
| *C08G 18/08* | (2006.01) | |
| *C08G 18/12* | (2006.01) | |
| *C08G 18/40* | (2006.01) | |
| *C08G 18/44* | (2006.01) | |
| *C08G 18/48* | (2006.01) | |
| *C08G 18/76* | (2006.01) | |
| *C08G 64/34* | (2006.01) | |
| *C08G 77/442* | (2006.01) | |
| *C08J 9/00* | (2006.01) | |
| *C08L 83/12* | (2006.01) | |
| *C08G 101/00* | (2006.01) | |

(52) U.S. Cl.
CPC .............. *C08G 18/14* (2013.01); *C08G 18/12* (2013.01); *C08G 18/44* (2013.01); *C08G 18/4804* (2013.01); *C08G 18/485* (2013.01); *C08G 64/34* (2013.01); *C08G 77/442* (2013.01); *C08G 2101/00* (2013.01)

(58) Field of Classification Search
None
See application file for complete search history.

(56) References Cited

U.S. PATENT DOCUMENTS

| | | | |
|---|---|---|---|
| 9,512,259 B2 | 12/2016 | Allen et al. | |
| 10,047,188 B2* | 8/2018 | Allen | C08G 18/72 |
| 10,106,641 B2* | 10/2018 | Klesczewski | C08G 18/7621 |
| 2008/0015272 A1* | 1/2008 | Mispreuve | C08G 18/67 521/170 |
| 2009/0306239 A1* | 12/2009 | Mijolovic | C08G 18/44 521/172 |
| 2016/0153162 A1* | 6/2016 | Botrie | E02D 27/00 52/292 |
| 2018/0044464 A1* | 2/2018 | Klesczewski | C08G 18/7621 |
| 2018/0273674 A1* | 9/2018 | Klesczewski | C08G 65/26 |
| 2018/0327537 A1* | 11/2018 | Gossner | C08G 18/4887 |
| 2018/0334529 A1 | 11/2018 | García Ruiz et al. | |
| 2020/0339732 A1 | 10/2020 | Kember et al. | |
| 2020/0399466 A1* | 12/2020 | Hilken | C08G 18/48 |
| 2020/0407485 A1* | 12/2020 | Hilken | C08J 9/125 |
| 2021/0024681 A1* | 1/2021 | Gossner | C08G 18/244 |
| 2021/0070916 A1* | 3/2021 | Hilken | C08G 18/5084 |
| 2022/0106428 A1* | 4/2022 | Li | C08G 18/7621 |

FOREIGN PATENT DOCUMENTS

| | | | |
|---|---|---|---|
| KR | 10-2016-0057617 A | | 5/2016 |
| KR | 101797462 B1 | | 11/2017 |
| KR | 102205306 B1 | | 1/2021 |
| KR | 10-2021-0049796 A | | 5/2021 |

* cited by examiner

*Primary Examiner* — Melissa A Rioja
(74) *Attorney, Agent, or Firm* — Fox Rothschild LLP

(57) ABSTRACT

Disclosed are a low-carbon polyurethane foam composition and a method for preparing the same. The low-carbon polyurethane foam composition may have improved foam cell uniformity while contributing to carbon reduction goals as a result of applying a polyether carbonate polyol containing a carbonate bond. The method for preparing the low-carbon polyurethane foam composition may include reacting a polyol mixture including a carbonate bond-containing polyether carbonate polyol and a petroleum-based polyether polyol, an isocyanate, and a silicone surfactant.

12 Claims, No Drawings

LOW-CARBON POLYURETHANE FOAM COMPOSITION FOR AUTOMOBILE INTERIOR MATERIAL AND PREPARATION METHOD THEREFOR

CROSS-REFERENCE TO RELATED APPLICATION

This application claims, under 35 U.S.C. § 119(a), the benefit of and priority to Korean Patent Application No. 10-2022-0032674 filed on Mar. 16, 2022, the entire contents of which are incorporated herein by reference.

TECHNICAL FIELD

The present invention relates to a low-carbon polyurethane foam composition and a method for preparing the same. The low-carbon polyurethane foam composition may have improved foam cell uniformity while contributing to carbon reduction goals as a result of applying a carbonate bond-containing polyether carbonate polyol.

BACKGROUND

In recent years, interest in low-carbon petrochemical materials such as organic polymer materials and polyurethane materials, which have been applied to automotive parts, has increased, and regulations on these petrochemical materials have become stricter. For example, manufacturing methods for emitting less carbon dioxide or chemically introducing carbon dioxide as a starting material have been introduced.

Various problems in the environmental field (e.g., light weight, vibration damping, provision of new functions, recyclability, and low carbon), the economic field (e.g., global standard material, and material integration), the social field (e.g., provision of new functions, creative technology, and carbon reduction), and problems from applying organic polymer materials and polyurethanes to automobiles have been addressed by automobile manufacturers.

In particular, environmental problems are unavoidable, and it is necessary to consider the role of organic polymer materials and polyurethanes for automobiles, which can contribute to recycling of used automobile parts and materials.

Polyurethane was developed by Otto Bayer, a German chemist, in 1937, and has various components and has been widely used in various fields due to its excellent reactivity. Polyurethane is a polymer compound having a plurality of urethane bonds (—NHCOO) produced by bonding between a polyol having two or more alcohol groups (—OH) in the molecule thereof and a polyisocyanate having two or more isocyanate groups (—NCO) in the molecule thereof.

Polyurethane may include a soft segment and a hard segment, and the polyol corresponding to the soft segment is composed of a polyester polyol and a polyether polyol.

Meanwhile, low-carbon technology has yet to be applied to polyurethane foam for an automobile interior material, because technologies for the synthesis of a polyol containing carbon dioxide, the advancement of the molecular structure of the polyol, and polyurethane compounding have not been developed.

Therefore, physical properties such as moldability, workability, hardness, thermal stability, and adhesive strength of polyurethane can be controlled by varying the kinds or mixing ratio of raw materials thereof, and thus it is very important to discover new materials as components thereof and devise a new compounding technology.

Among the types of elastomers for automobiles, polyurethane-based foam has been produced from a polyol and an isocyanate as main raw materials.

In the related art, low-carbon synthesis methods for the two materials have not been developed, a specific compounding technology for the two materials has not been developed, and thus a low-carbon production method for polyurethane-based elastomers for automobile parts has not been developed.

Therefore, under the above-described background, there has been industrial demand for the development of a polyol synthesis method of introducing carbon dioxide as a starting material and the invention of a low-carbon polyurethane foam composition for an automobile part material, which is prepared using the polyol synthesis method.

SUMMARY OF THE INVENTION

In preferred aspects, provided is a method of synthesizing a ternary copolymerization-based polyol synthesis by introducing carbon dioxide as a starting material, a low-carbon polyurethane foam composition having excellent performance while contributing to carbon reduction goals as a result of reacting an isocyanate and a silicone surfactant in appropriate amounts by using a polyol synthesis method, and a method for preparing the low-carbon polyurethane foam composition.

Objects of the present invention are not limited to the above-mentioned object. Objects of the present invention will become more apparent from the following description, and will be achieved by means and combinations thereof described in the claims.

In an aspect, provided is a polyurethane foam composition that may be obtained by reacting a polyol mixture including a carbonate bond-containing polyether carbonate polyol and a petroleum-based polyether polyol, an isocyanate, and a silicone surfactant.

In an aspect, provided is a method of preparing a polyurethane foam composition. The method may include reacting (i) a polyol mixture including a carbonate bond-containing polyether carbonate polyol and a petroleum-based polyether polyol, (ii) an isocyanate, and (iii) a silicone surfactant.

The polyurethane foam composition may include 100 parts by weight of the polyol mixture, 20 to 60 parts by weight of the isocyanate, and 0.5 to 2 parts by weight of the silicone surfactant, and the polyol mixture may include an amount of 50 to 80 wt % of the polyether carbonate polyol and an amount of 20 to 40 wt % of the petroleum-based polyether polyol, based on the total weight of the polyol mixture.

The polyether carbonate polyol comprises a copolymer of carbon dioxide ($CO_2$), propylene oxide (PO), and ethylene oxide (EO).

The polyether carbonate polyol may include an amount of 10 to 20 wt % of the carbonate group based on the total weight of the polyether carbonate polyol.

The polyether carbonate polyol may include an amount of 5 to 15 wt % of ethylene oxide based on the total weight of the polyether carbonate polyol.

The polyether carbonate polyol may have a hydroxyl value of 40 to 80 mg KOH/g and an average molecular weight (Mw) of 4,500 to 5,500 g/mol. The petroleum-based polyether polyol may have an average molecular weight (Mw) of 4,500 to 5,500 g/mol.

The petroleum-based polyether polyol comprises a copolymer of propylene oxide (PO) and ethylene oxide (EO).

The isocyanate may include at least one selected from the group consisting of monoisocyanates, diisocyanates, and combinations thereof.

The isocyanate may suitably include methylene diphenyl diisocyanate represented by the following Formula 1:

[Formula 1]

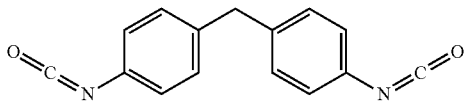

The isocyanate may have 2.0 to 2.5 functional groups.

The silicone surfactant may suitably include a non-hydrolysable polysiloxane-polyalkylene block polymer.

In further aspect, provided is a method for preparing a polyurethane foam composition. The method may include steps of: preparing a polyol mixture by mixing a carbonate bond-containing polyether carbonate polyol and a petroleum-based polyether polyol; obtaining a first reaction product by mixing the polyol mixture with an isocyanate; and obtaining a second reaction product by mixing the first reaction product with a silicone surfactant.

In the step of preparing the polyol mixture, the polyol mixture may be obtained by mixing an amount of 50 to 80 wt % of the polyether carbonate polyol and an amount of 20 to 40 wt % of the petroleum-based polyether polyol, based on the total weight of the polyol mixture.

In the step of obtaining the first reaction product, 20 to 60 parts by weight of the isocyanate may be added to 100 parts by weight of the polyol mixture.

The step of obtaining the first reaction product may be performed at a temperature of 30 to 40° C. In the step of obtaining the second reaction product, 0.5 to 2 parts by weight of the silicone surfactant may be added to 100 parts by weight of the first reaction product.

The step of obtaining the second reaction product may be performed at a temperature of 40 to 50° C.

Also provided are polyurethane foam compositions prepared by the methods described herein.

Further provided are polyurethane foam compositions obtainable by the methods described herein.

Other aspects of the invention are disclosed infra,

DETAILED DESCRIPTION

The above objects, other objects, features and advantages of the present invention will become apparent with reference to the embodiments described below in conjunction with the accompanying drawings. However, the present invention is not limited to the embodiments disclosed below and may be embodied in a variety of different forms. Rather, the embodiments disclosed herein are provided so that this invention will be thorough and complete, and will fully convey the spirit of the present invention to those skilled in the art.

In the present specification, it should be understood that terms such as "include" and "have" are intended to denote the existence of mentioned characteristics, numbers, steps, operations, components, parts, or combinations thereof, but do not exclude the probability of existence or addition of one or more other characteristics, numbers, steps, operations, components, parts, or combinations thereof.

Since all numbers, values and/or expressions referring to quantities of components, reaction conditions, polymer compositions, and mixtures used in the present specification are subject to various uncertainties of measurement encountered in obtaining such values, unless otherwise indicated, all are to be understood as modified in all instances by the term "about."

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Where a numerical range is disclosed herein, such a range is continuous, inclusive of both the minimum and maximum values of the range as well as every value between such minimum and maximum values, unless otherwise indicated. Still further, where such a range refers to integers, every integer between the minimum and maximum values of such a range is included, unless otherwise indicated.

In the present specification, where a range is stated for a parameter, it will be understood that the parameter includes all values within the stated range, inclusive of the stated endpoints of the range. For example, a range of 5 to 10 will be understood to include the values 5, 6, 7, 8, 9, and 10, as well as any sub-range such as 6 to 10, 7 to 10, 6 to 9, and 7 to 9, and also include any value and range between the integers which are reasonable in the context of the range stated, such as 5.5, 6.5, 7.5, 5.5 to 8.5 and 6.5 to 9. For example, a range of "10% to 30%" will be understood to include the values 10%, 11%, 12%, 13%, etc., and all integers up to and including 30%, as well as any sub-range such as 10% to 15%, 12% to 18%, 20% to 30%, etc., and also include any value between the integers which are reasonable in the context of the range stated, such as 10.5%, 15.5%, 25.5%, etc.

A polyurethane foam composition according to the present invention may be obtained by reacting a polyol mixture including a carbonate bond-containing polyether carbonate polyol and a petroleum-based polyether polyol, an isocyanate, and a silicone surfactant.

Specifically, the polyurethane foam composition may include 100 parts by weight of the polyol mixture, 20 to 60 parts by weight of the isocyanate, and 0.5 to 2 parts by weight of the silicone surfactant, and the polyol mixture may contain 50 to 80 wt % of the polyether carbonate polyol and 20 to 40 wt % of the petroleum-based polyether polyol.

Hereinafter, each component of the polyurethane foam composition according to the present invention will be described in more detail.

(A) Polyol Mixture

The polyol mixture may be included in the polyurethane foam composition in an amount of 100 parts by weight, and may include a polyether carbonate polyol and a petroleum-based polyether polyol.

1) Polyether Carbonate Polyol

The polyether carbonate polyol may contain a carbonate bond, and may be included in an amount of 50 to 80 wt % based on the total weight of the polyol mixture.

The polyether carbonate polyol is a polyether polyol produced by a ternary copolymerization method of chemically introducing carbon dioxide.

Specifically, the polyether carbonate polyol may be a polyether carbonate polyol produced according to the following Reaction Scheme 1 by copolymerizing carbon dioxide ($CO_2$), propylene oxide (PO) and ethylene oxide (EO):

[Reaction Scheme 1]

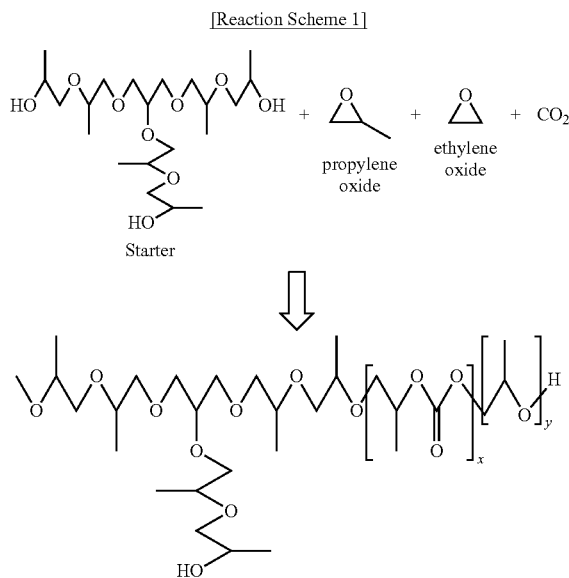

The polyether carbonate polyol may be a polyol containing a carbonate bond chemically introduced into the chain structure of the polyether polyol by applying carbon dioxide in the synthesis step.

The polyether carbonate polyol may be synthesized by adding carbon dioxide as a reactant in the synthesis process, and in the synthesis process, carbon dioxide may be reduced compared to conventional petroleum-based production. The polyether carbonate polyol that is used in the present invention is a polyol containing a carbon dioxide-based raw material in an amount of 20%, and as a result, the use of petrochemicals in the production process may be reduced by 20%.

Therefore, the synthetic product is characterized by carbon dioxide, the content of polypropylene oxide (PO) used in the conventional art is reduced by the content of carbon dioxide in the synthetic product, and thus there is an effect of reducing carbon dioxide in the synthetic product itself and the synthesis process.

The polyether carbonate polyol may contain 10 to 20 wt % of the carbonate bond.

The polyether carbonate polyol may contain 5 to 15 wt % of ethylene oxide.

The polyether carbonate polyol may have a hydroxyl value of 40 to 80 mg KOH/g and an average molecular weight (Mw) of 4,500 to 5,500 g/mol.

2) Petroleum-Based Polyether Polyol

The petroleum-based polyether polyol is a polyether polyol produced by a binary copolymerization method that does not chemically introduce carbon dioxide.

The petroleum-based polyether polyol has the advantages of having excellent thermal stability, excellent tensile strength, and excellent resistance to oil or the like.

Specifically, the petroleum polyether polyol is synthesized by copolymerizing propylene oxide (PO) and ethylene oxide (EO).

The petroleum-based polyether polyol may be included in an amount of 20 to 40 wt % based on the total weight of the polyol mixture.

The petroleum-based polyether polyol may have an average molecular weight (Mw) of 4,500 to 5,500 g/mol.

(B) Isocyanate

The isocyanate may be contained in the polyurethane adhesive composition in an amount of 20 to 60 parts by weight based on 100 parts by weight of the polyol mixture. Preferably, it may be contained in an amount of 30 to 50 parts by weight. If the content of the isocyanate is less than 20 parts by weight, a problem may arise in that the performance of the final material is degraded. On the other hand, if the content of the isocyanate is more than 60 parts by weight, a problem may arise in that appropriate viscoelastic properties required as an adhesive cannot be achieved due to excessive chemical reaction and hardness enhancement.

The isocyanate is an essential component that is added in the production of polyurethane, and undergoes a chemical reaction with the polyol.

The isocyanate may serve to uniformize the distribution of a hard segment and a soft segment in the polyurethane structure by chemical reaction with the low-carbon polyol containing carbon dioxide.

The isocyanate may include at least one selected from the group consisting of monoisocyanates, diisocyanates, and combinations thereof.

Specifically, the isocyanate may include methylene diphenyl diisocyanate represented by the following Formula 1:

[Formula 1]

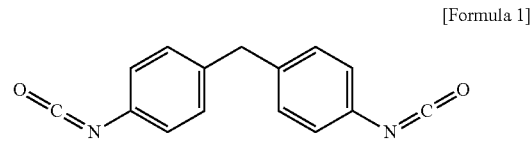 [SMILES: O=C=Nc1ccc(Cc2ccc(N=C=O)cc2)cc1]

The isocyanate may have 2.0 to 2.5 functional groups, and may exist in a liquid state at room temperature.

(C) Silicone surfactant

The silicone surfactant serves to ensure the moldability of the polyurethane foam composition.

Conventional polyurethane foam elastomers for automobile interior materials may have elastic properties and may be used for automobiles only when independent cells are created while a urethane chemical reaction occurs. However, when the polyether carbonate polyol is applied, there is a difficulty in forming normal foam using existing compounding materials.

Accordingly, in the present invention, the silicone surfactant is compounded in a specific amount, and thus it is possible to make the urethane foam wall strong while reducing the cell size during molding.

The silicone surfactant may be contained in the polyurethane adhesive composition in an amount of 0.5 to 2 parts by weight based on 100 parts by weight of the polyol mixture. If the content of the silicone surfactant is less than 0.5 parts by weight, a problem may arise in that the structure of the final material is unstable, which may degrade the mechanical properties and durability thereof. On the other hand, if the content of the silicone surfactant is more than 2 parts by weight, a problem may arise in that an abnormal reaction occurs, resulting in partial deviation in physical properties and reduction in performance uniformity.

Specifically, the silicone surfactant is preferably a non-hydrolysable polysiloxane-polyalkylene block polymer.

(D) Additives

Additives serve to impart various functionalities to the polyurethane adhesive composition. As the additives, any known additives that do not impair the effects of the present invention may be used without particular limitation.

Specifically, the additives serve to improve the flame retardancy of the polyurethane foam composition.

The additives may include a reactive flame retardant and an additive flame retardant. Specifically, the additives may include at least one selected from the group consisting of halogen-based flame retardants, phosphorus-based flame retardants, inorganic flame retardants, and combinations thereof.

A method for preparing the polyurethane foam composition according to the present invention includes steps of: preparing a polyol mixture by mixing a carbonate bond-containing polyether carbonate polyol and a petroleum-based polyether polyol; obtaining a first reaction product by mixing the polyol mixture with an isocyanate; and obtaining a second reaction product by mixing the first reaction product with a silicone surfactant.

Each step of the method for preparing a polyurethane foam composition according to the present invention will now be described in detail.

First, in the step of preparing the polyol mixture, the polyether carbonate polyol and the petroleum-based polyether polyol may be mixed together.

In this step, the polyol mixture may be prepared by mixing 50 to 80 wt % of the polyether carbonate polyol and 20 to 40 wt % of the petroleum-based polyether polyol.

Next, in the step of obtaining the first reaction product, the first reaction product may be obtained by mixing 100 parts by weight of the polyol mixture with 20 to 60 parts by weight of the isocyanate.

The step of obtaining the first reaction product is preferably performed at a temperature of 30 to 40° C.

Finally, in the step of obtaining the second reaction, the second reaction product as a final reaction product may be synthesized by mixing 100 parts by weight of the first reaction product with 0.5 to 2 parts by weight of the silicone surfactant.

The step of obtaining the second reaction product may be performed at a temperature of 40 to 50° C.

Hereinafter, the present invention will be described in more detail with reference to specific examples. The following examples are only examples to help the understanding of the present invention, and the scope of the present invention is not limited thereto.

First, compositions of Examples 1 to 7 were prepared in the following manner using the components and contents shown in Table 1 below.

Examples 1 to 7

Low-carbon polyurethane foam compositions for automobile interior materials were prepared in the following manner using the components and contents shown in Table 1 below.

Specifically, a polyol mixture was prepared by mixing a petroleum-based polyether polyol, which is a binary copolymer, and a carbonate bond-containing polyether carbonate polyol, which is a ternary copolymer, under the conditions of 1 atm and 30 to 32° C.

Then, methylene diphenyl diisocyanate was added to and mixed with 100 parts by weight of the polyol mixture to obtain a first reaction product.

Next, a silicon surfactant was added to and mixed with the first reaction product, and then the temperature was increased to 40 to 50° C. to obtain a second reaction product. In this case, the second reaction product was reacted with stirring at 500 to 700 rpm using a stirrer, and then poured into a square mold to finally obtain a molded foam article.

TABLE 1

| | | Example 1 | Example 2 | Example 3 | Example 4 | Example 5 | Example 6 | Example 7 |
|---|---|---|---|---|---|---|---|---|
| Unit: wt % | | | | | | | | |
| Polyol mixture | Polyisocyanate carbonate polyol | 66.7 | 69 | 66.7 | 69 | 66.7 | 69 | 66.7 |
| | Petroleum based polyether polyol | 33.3 | 31 | 33.3 | 31 | 33.3 | 31 | 33.3 |
| Unit: parts by weight | | | | | | | | |
| | Polyol mixture | 100 | 100 | 100 | 100 | 100 | 100 | 100 |
| Isocyanate | Methylene diphenyl diisocyanate | 52 | 5 | 53 | 52 | 50 | 51 | 52 |
| Silicone surfactant | Non-hydrolyzable polysiloxane-polyalkylene block polymer | 1.5 | 1.4 | 1.3 | 1.6 | 1.7 | 1.4 | 1.5 |

1. Polyol mixture: Polyether carbonate polyol: a polyol synthesized by ternary copolymerization of carbon dioxide, propylene oxide and ethylene oxide; hydroxyl value: 40 to 80 mg KOH/g; average molecular weight: 4,500 to 5,500 g/mol; product synthesized by Hyundai Motor Company Petroleum-based polyether polyol: a polyol synthesized by binary copolymerization of propylene oxide and ethylene oxide; average molecular weight: 5,000 g/mol
2. Isocyanate: methylene diphenyl diisocyanate (Sigma-Aldrich)
3. Silicone surfactant: non-hydrolyzable polysiloxane-polyalkylene block polymer (Evonik) chemical structure: non-hydrolysable polysiloxane-polyalkylene block polymer characterized by making the urethane foam wall strong while reducing the cell size during molding of PU foam to which $CO_2$ polyol is applied.

Comparative Examples 1 to 7

Compositions of Comparative Examples 1 to 7 were prepared in the same manner as in Examples 1 to 7 above, except that the components and contents shown in Table 2 below were used. In the Comparative Examples, compositions were prepared using a different type and content of silicone surfactant.

TABLE 2

|  |  | Comp. Example 1 | Comp. Example 2 | Comp. Example 3 | Comp. Example 4 | Comp. Example 5 | Comp. Example 6 | Comp. Example 7 |
| --- | --- | --- | --- | --- | --- | --- | --- | --- |
| Unit: wt % | | | | | | | | |
| Polyol mixture | Polyisocyanate carbonate polyol | 66.7 | 69 | 66.7 | 69 | 66.7 | 69 | 66.7 |
| | Petroleum based polyether polyol | 33.3 | 31 | 33.3 | 31 | 33.3 | 31 | 33.3 |
| Unit: parts by weight | | | | | | | | |
| Polyol mixture | | 100 | 100 | 100 | 100 | 100 | 100 | 100 |
| Isocyanate | Methylene diphenyl diisocyanate | 52 | 51 | 53 | 52 | 50 | 51 | 52 |
| Silicon surfactant | Polysiloxane-polyalkylene block polymer | 1.5 | 1.4 | 1.3 | 1.6 | 1.7 | 1.4 | 1.5 |

1. Polyol mixture: Polyether carbonate polyol: a polyol synthesized by ternary copolymerization of carbon dioxide, propylene oxide and ethylene oxide; hydroxyl value: 40 to 80 mg KOH/g; average molecular weight: 4,500 to 5,500 g/mol; product synthesized by Hyundai Motor Company Petroleum-based polyether polyol: a polyol synthesized by binary copolymerization of propylene oxide and ethylene oxide; average molecular weight: 5,000 g/mol
2. Isocyanate: methylene diphenyl diisocyanate (Sigma-Aldrich)
3. Silicone surfactant: Surfactant used in compounding of existing petroleum-based polyols Chemical structure: polysiloxane-polyoxyalkylene block copolymer (Evonik)

Test Examples

For each specimen prepared from the polyurethane foam composition according to each of the Examples and the Comparative Examples, the physical properties of the specimens were measured by the following method, and the results of measurement are shown in Tables 3 and 4 below.
[Evaluation Method]
(1) Evaluation of moldability of foamed elastomer: each composition was poured into a square mold to obtain a molded foam article, and then the moldability of the molded foam article was evaluated as "pass" or "fail" through appearance evaluation.

Specifically, each polyurethane foam composition was poured into a mold having a size of 400 mm×400 mm×10 mm and made of a typical metal (aluminum), and then subjected to foaming reaction. Then, the molded foam article was released from the mold, subjected to a crushing operation for about 1 minute, and then left at room temperature for 24 hours. Finally, through the evaluation of the appearance of the molded article, the moldability was evaluated as "pass" or "fail".

TABLE 3

| | Evaluation of moldability of foamed elastomer |
| --- | --- |
| Example 1 | Pass |
| Example 2 | Pass |
| Example 3 | Pass |
| Example 4 | Pass |
| Example 5 | Pass |
| Example 6 | Pass |
| Example 7 | Pass |

TABLE 4

| | Evaluation of moldability of foamed elastomer |
| --- | --- |
| Comparative Example 1 | Fail |
| Comparative Example 2 | Fail |
| Comparative Example 3 | Fail |
| Comparative Example 4 | Fail |
| Comparative Example 5 | Fail |
| Comparative Example 6 | Fail |
| Comparative Example 7 | Fail |

Referring to Table 3 above, it could be confirmed that, in Examples 1 to 7 in which the carbonate bond-containing polyol was used, a high level of moldability was achieved under specific conditions by using the non-hydrolyzable silicone surfactant in an appropriate amount.

On the other hand, referring to Table 4 above, it could be confirmed that, in Comparative Examples 1 to 7 in which the non-hydrolyzable silicone surfactant was not used or the components and contents according to the present invention were not satisfied, the moldability was relatively poor compared to that in the Examples.

Thus, it could be seen that, when the polyurethane foam composition according to the present invention contained each component in an appropriate amount and was prepared using the non-hydrolyzable polysiloxane-polyalkylene block polymer as the silicone surfactant, it had excellent quality without deviation between the specimens.

Therefore, the polyurethane adhesive composition according to the present invention may have excellent adhesive performance regardless of the material compared to a petroleum-based polyurethane foam composition because it is prepared by mixing the polyol mixture including the carbonate bond-containing polyether carbonate polyol and the petroleum-based polyether polyol, the isocyanate, and the silicone surfactant in appropriate amounts, and allowing the mixture to react.

Meanwhile, the polyurethane foam composition is not limited in its field of use, but may be used as an adhesive material for an automobile part. In particular, the polyurethane foam composition shows a high level of adhesive performance when applied to various materials and different materials for automobiles, and thus it is highly industrially applicable and may be actively used as a low-carbon foam elastomer for automobiles in the future.

As described above, the polyurethane adhesive composition according to the present invention is prepared by reacting the polyol mixture, which contains the carbonate bond-containing polyether polyol and the petroleum-based polyether polyol, the isocyanate, and the silicone surfactant in appropriate amounts, and allowing the mixture to react, and thus may exhibit elasticity and adhesive performance comparable to that of existing petroleum-based polyurethane foam while contributing to carbon reduction goals.

In addition, the method for preparing a polyurethane adhesive composition according to the present invention provides a synthesis method that improves the cell uniformity of foam, and thus the polyurethane adhesive composition may have superior external vibration stress relief performance to polyurethane foam based on petroleum polyether polyol.

The effects of the present invention are not limited to the above-mentioned effects. It is to be understood that the effects of the present invention include all effects that may be deduced from the above description.

While the present invention has been described with reference to the particular illustrative embodiments, it will be understood by those skilled in the art to which the present invention pertains that the present invention may be embodied in other specific forms without departing from the technical spirit or essential characteristics of the present invention. Therefore, the embodiments described above are considered to be illustrative in all respects and not restrictive.

What is claimed is:

1. A polyurethane foam composition comprising:
   a polyol mixture comprising a carbonate bond-containing polyether carbonate polyol and a petroleum-based polyether polyol, an isocyanate, and a silicone surfactant,
   wherein the silicone surfactant is a non-hydrolysable polysiloxane-polyalkylene block polymer,
   wherein the polyurethane foam composition comprises 100 parts by weight of the polyol mixture, 20 to 60 parts by weight of the isocyanate, and 0.5 to 2 parts by weight of the silicone surfactant, and
   wherein the polyol mixture comprises an amount of 50 to 80 wt % of the polyether carbonate polyol and an amount of 20 to 40 wt % of the petroleum-based polyether polyol, based on the total weight of the polyol mixture, and
   wherein the polyether carbonate polyol is copolymerized according to the following Reaction Scheme

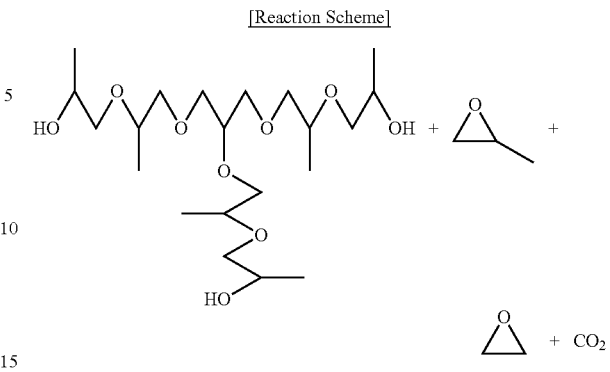

2. The polyurethane foam composition of claim 1, wherein the polyether carbonate polyol comprises an amount of 10 to 20 wt % of the carbonate group based on the total weight of the polyether carbonate polyol.

3. The polyurethane foam composition of claim 1, wherein the polyether carbonate polyol comprises an amount of 5 to 15 wt % of ethylene oxide based on the total weight of the polyether carbonate polyol.

4. The polyurethane foam composition of claim 1, wherein the polyether carbonate polyol has a hydroxyl value of 40 to 80 mg KOH/g and an average molecular weight (Mw) of 4,500 to 5,500 g/mol.

5. The polyurethane foam composition of claim 1, wherein the petroleum-based polyether polyol has an average molecular weight (Mw) of 4,500 to 5,500 g/mol.

6. The polyurethane foam composition of claim 1, wherein the petroleum-based polyether polyol comprises a copolymer of propylene oxide (PO) and ethylene oxide (EO).

7. The polyurethane foam composition of claim 1, wherein the isocyanate comprises at least one selected from the group consisting of monoisocyanates, diisocyanates, and combinations thereof.

8. The polyurethane foam composition of claim 1, wherein the isocyanate comprises methylene diphenyl diisocyanate represented by the following Formula 1:

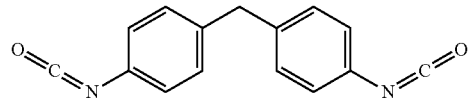

9. The polyurethane foam composition of claim 1, wherein the isocyanate has 2.0 to 2.5 functional groups.

10. A method for preparing a polyurethane foam, the method comprising steps of:
    preparing a polyol mixture comprising a carbonate bond-containing polyether carbonate and a petroleum-based polyether polyol;
    obtaining a first reaction product by mixing the polyol mixture with an isocyanate; and
    obtaining a second reaction product by mixing the first reaction product with a silicone surfactant,
    wherein the silicone surfactant is a non-hydrolysable polysiloxane-polyalkylene block polymer,
    wherein the polyol mixture comprises an amount of 50 to 80 wt % of the polyether carbonate polyol and an amount of 20 to 40 wt % of the petroleum-based polyether polyol based on the total weight of the polyol mixture, wherein the step of obtaining the first reaction product comprises adding 20 to 60 parts by weight of the isocyanate to 100 parts by weight of the polyol mixture, wherein the step of obtaining the second reaction product comprises adding 0.5 to 2 parts by weight of the silicone surfactant to 100 parts by weight of the first reaction product, and wherein the polyether carbonate polyol is copolymerized according to the following Reaction Scheme

[Reaction Scheme]

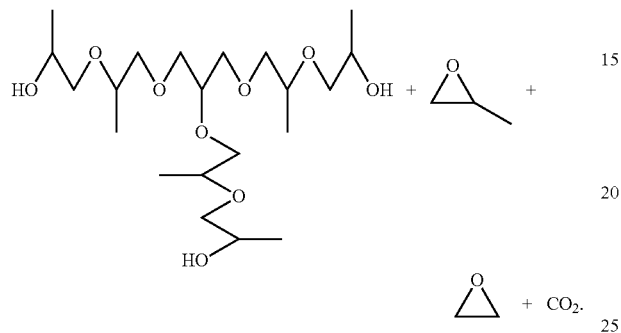

+ $CO_2$.

11. The method of claim 10, wherein the step of obtaining the first reaction product is performed at a temperature of 30 to 40° C.

12. The method of claim 10, wherein the step of obtaining the second reaction product is performed at a temperature of 40 to 50° C.

* * * * *